(12) United States Patent
Saito et al.

(10) Patent No.: US 9,329,343 B2
(45) Date of Patent: May 3, 2016

(54) OPTICAL FIBER TRANSITION STRUCTURE

(71) Applicant: AFL Telecommunications LLC, Duncan, SC (US)

(72) Inventors: Daigo Saito, Greer, SC (US); Anthony Nieves, Fountain Inn, SC (US); Kyle Marchek, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/431,866

(22) PCT Filed: Jan. 17, 2014

(86) PCT No.: PCT/US2014/012075
§ 371 (c)(1),
(2) Date: Mar. 27, 2015

(87) PCT Pub. No.: WO2014/113690
PCT Pub. Date: Jul. 24, 2014

(65) Prior Publication Data
US 2015/0253503 A1 Sep. 10, 2015

Related U.S. Application Data

(60) Provisional application No. 61/753,555, filed on Jan. 17, 2013.

(51) Int. Cl.
G02B 6/255 (2006.01)
G02B 6/44 (2006.01)
G02B 6/245 (2006.01)
G02B 6/42 (2006.01)

(52) U.S. Cl.
CPC .............. *G02B 6/2558* (2013.01); *G02B 6/245* (2013.01); *G02B 6/4285* (2013.01); *G02B 6/44* (2013.01); *G02B 6/4436* (2013.01)

(58) Field of Classification Search
CPC .. G02B 6/2551; G02B 6/2558; G02B 6/2835; G02B 6/2552; G02B 6/2553; G02B 6/2555; G02B 6/255
USPC ................................... 385/95, 96, 97, 98, 99
See application file for complete search history.

(56) References Cited

U.S. PATENT DOCUMENTS

| 5,838,861 | A | 11/1998 | Bunde |
| 6,856,748 | B1 | 2/2005 | Elkins, II et al. |
| 7,785,019 | B2 * | 8/2010 | Lewallen ............. G02B 6/3817 385/53 |
| 8,750,667 | B2 * | 6/2014 | Le Dissez ............ G02B 6/4452 385/135 |
| 2006/0067636 | A1 | 3/2006 | Bludau et al. |
| 2009/0060421 | A1 | 3/2009 | Parikh et al. |

OTHER PUBLICATIONS

International Search Report for PCT/US2014/012075 dated May 12, 2014 [PCT/ISA/210].
Written Opinion for PCT/US2014/012075 dated May 12, 2014 [PCT/ISA/237].

* cited by examiner

*Primary Examiner* — Jennifer Doan
(74) *Attorney, Agent, or Firm* — Dority & Manning, P.A.

(57) ABSTRACT

The present invention is related to a method of assembling a transition assembly and a transition assembly. The method described herein may comprise stripping a plurality of fibers at an end of a cable; splicing the plurality of fibers from the cable with a plurality of pigtails; and protecting the bare fiber with a cover. The transition assembly may comprise a fiber protection part and a cover that covers the fiber protection part. The fiber protection part may have openings.

7 Claims, 9 Drawing Sheets

OPTICAL FIBER TRANSITION STRUCTURE

CROSS-REFERENCE TO RELATED APPLICATIONS

This application is a National Stage of International Application No. PCT/US2014/012075, filed on Jan. 17, 2014, which claims priority from U.S. Provisional Application No. 61/753,555, filed on Jan. 17, 2013, the contents of all of which are incorporated herein by reference in their entirety.

BACKGROUND

1. Field

The invention relates to a method of assembling a transition assembly.

2. Related Art

The background information provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Figure 1:
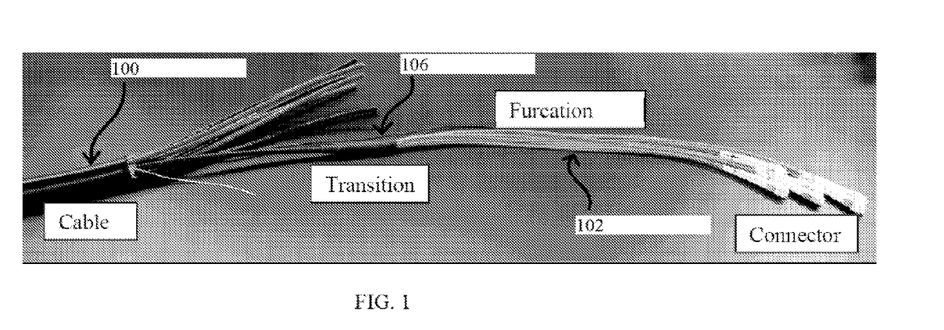
FIG. 1 is an exemplary embodiment of today's transition assembly or structure.

Referring to the drawings, FIG. 1 shows an exemplary embodiment of today's transition assembly or structure. Today's transition assembly comprises a cable 100, a plurality of furcations 102, a plurality of connectors 104 attached to the plurality of furcations 102, and a plurality of transitions 106 for acting as a bridge between the cable 100 and the plurality of furcations 102. Today's technology requires a lot of equipment and processes to realize a furcation structure and terminate connectors on the end of distribution cable. A user is not able to easily modify the transition assembly in the field. Also, a length of cable 100 is usually given to the user at a predetermined length already attached to the connectors 104. Thus, it is difficult for a user to customize the length of a cable 100

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

In an exemplary embodiment, the assembly of the present disclosure is able to make a transition without a furcation tube assembly process and a connector assembly.

In an exemplary embodiment, the assembly process of the present disclosure is quick and utilizes less equipment than the standard. In an exemplary embodiment, the assembly process may include the steps of preparing fiber at an end of a cable, splicing the fiber from the cable with a pigtail, protecting the bare fiber with a cover, and over-molding a transition area with a metal rod.

In an exemplary embodiment, advantages and benefits of the present disclosure may include, but are not limited to the following:

A. The assembly has manufacturing transitions independent of traditional factory locations. Since fusion splicers and over molding machines are small and relatively portable, transitions can be completed at locations near a customer's point of use.

B. The assembly can provide connector-terminated cable near the field where it is used so it can eliminate shipping cost to the factory, lead time for assembly of connector and shipping from factory to the field where it is used.

C. Metal rods can prevent shrinkage of over molding material at low temperature so the fiber inside of the transition is straight and no bending optical loss at low temperature occurs.

D. The over molding polymer can flow through openings in the protection part to provide intimate contact between the polymer and fibers protecting the fibers from material dimensional changes due to environmental temperature extremes.

Figure 2A:
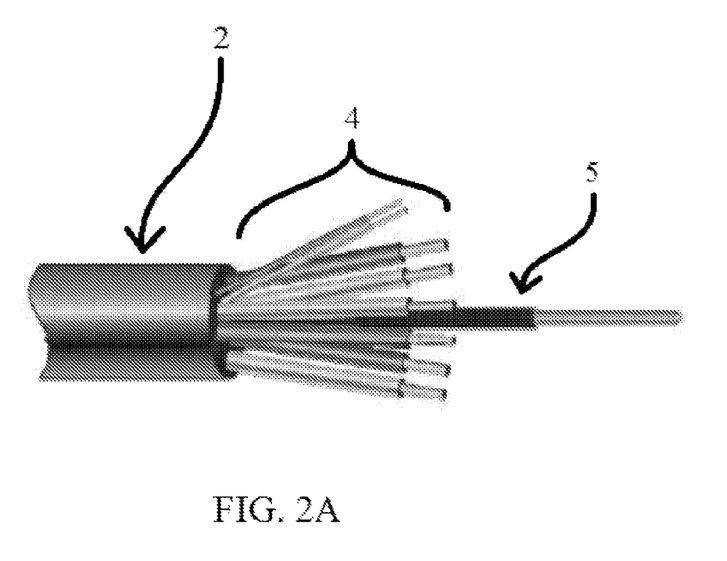
FIG. 2a is an exemplary embodiment of a first step for assembling a transition assembly 1 involving prepping a cable 2.

Referring to the drawings, FIG. 2a is an exemplary embodiment of a first step for assembling a transition assembly 1 involving prepping a cable 2. The transition assembly comprises a cable 2, and a plurality of fibers 5 for sending information. In an exemplary embodiment, the cable 2 also comprises a plurality of wires 4. In an exemplary embodiment, the plurality of wires 4 are copper wires. In an exemplary embodiment, a cable 2 of any length may be used, and the cable 2, along with the plurality of fibers 5, may be stripped and prepared to be spliced at any point along the length of the cable 2.

Figure 2B:
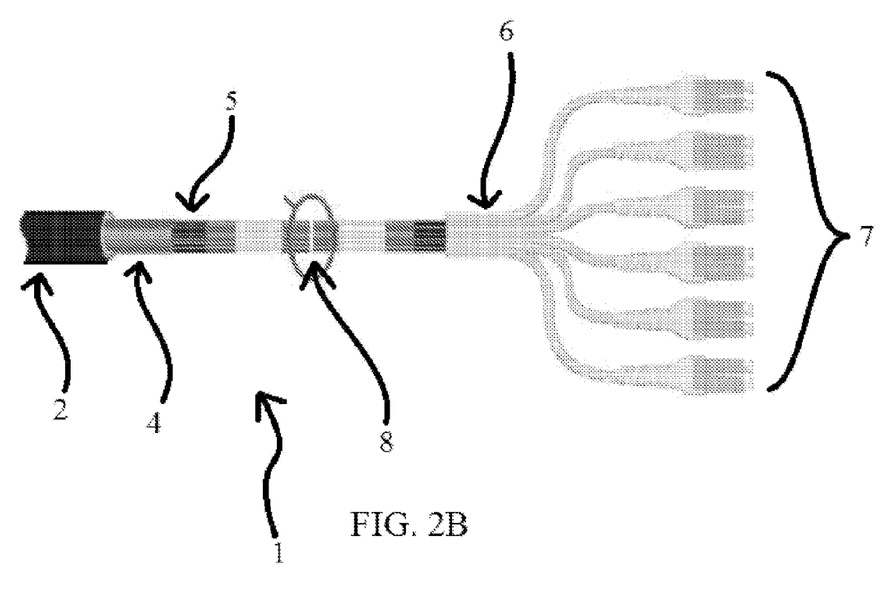
FIG. 2b is an exemplary embodiment of a second step for assembling a transition assembly 1 involving a fusion splice 8.

FIG. 2b is an exemplary embodiment of a second step for assembling a transition assembly 1 involving a fusion splice 8. A plurality of pigtails 6 are shown comprising a plurality of connectors 7 for connecting the plurality of pigtails 6 to a generic system. In an exemplary embodiment, a fusion splicer 8 is used to connect the plurality of pigtails 6 and the plurality of fibers 5. In an exemplary embodiment, a user in the field connects the plurality of fibers 5, which have been stripped and prepared, to the plurality of pigtails 6 using the fusion splicer. In an exemplary embodiment, 6 inches of the stripped and prepared plurality of fibers 5 are necessary to interact with the fusion splicer 8 and the plurality of pigtails 6.

Figure 2C:
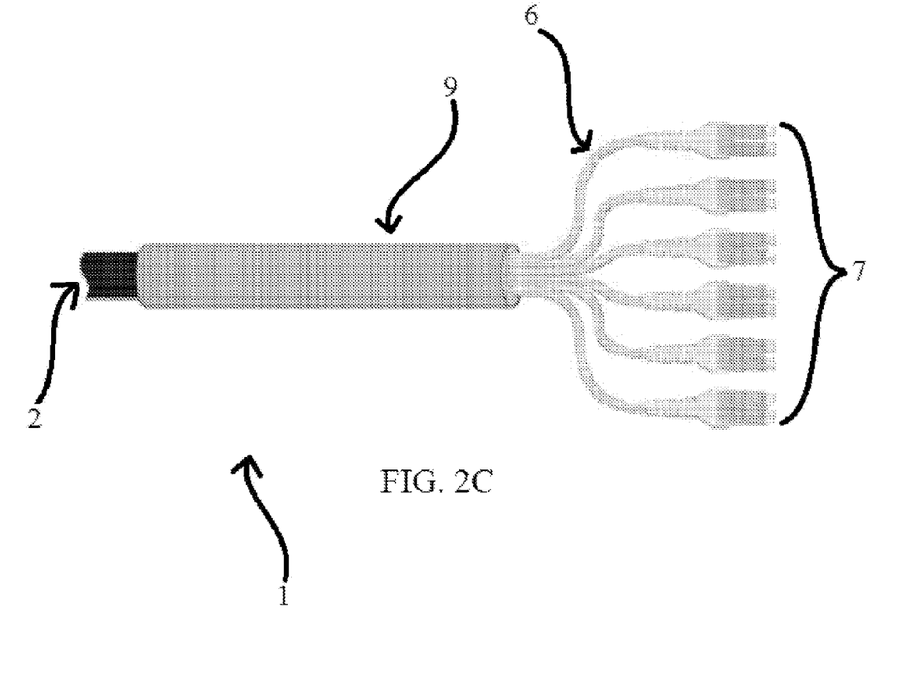
FIG. 2c is an exemplary embodiment of a third step for assembling a transition assembly 1 involving encapsulation of the cable 2.

FIG. 2c is an exemplary embodiment of a third step for assembling a transition assembly 1 involving encapsulation of the cable 2. In an exemplary embodiment, the cover 9 encapsulates the cable 2 and the plurality of pigtails 6 as shown. In an exemplary embodiment, the cover 9 comprises polymer material. In an exemplary embodiment, the polymer material comprises epoxy.

Figure 3A:
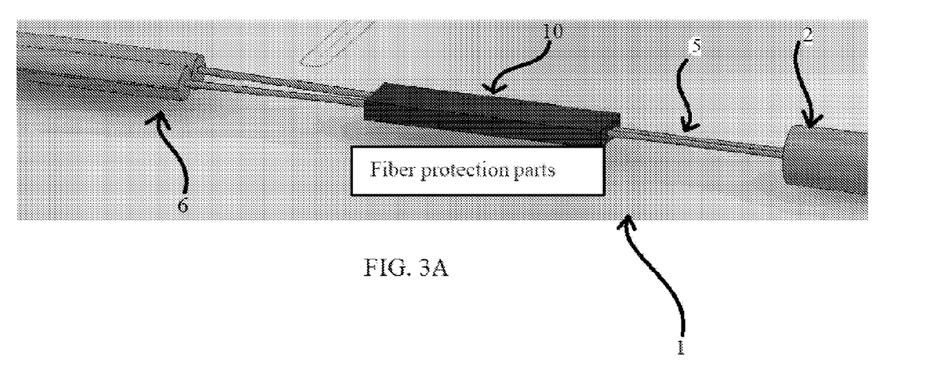
FIG. 3a is an exemplary embodiment of a transition assembly 1.

FIG. 3a is an exemplary embodiment of a transition assembly 1. The transition assembly comprises a cable 2 and a plurality of pigtails 6. In an exemplary embodiment, a fiber protection part 10 protects the fusion between the plurality of fibers 5 and the plurality of pigtails 6. In an exemplary embodiment, the fiber protection part 10 has openings (not shown) on top so a polymer (not shown) may solidify in intimate contact with plurality of fibers 5. In an exemplary embodiment, the fusion splice is in a transition area so that a connection in the assembly can be done in advance in a factory by using standard equipment and processes.

Figure 3B:
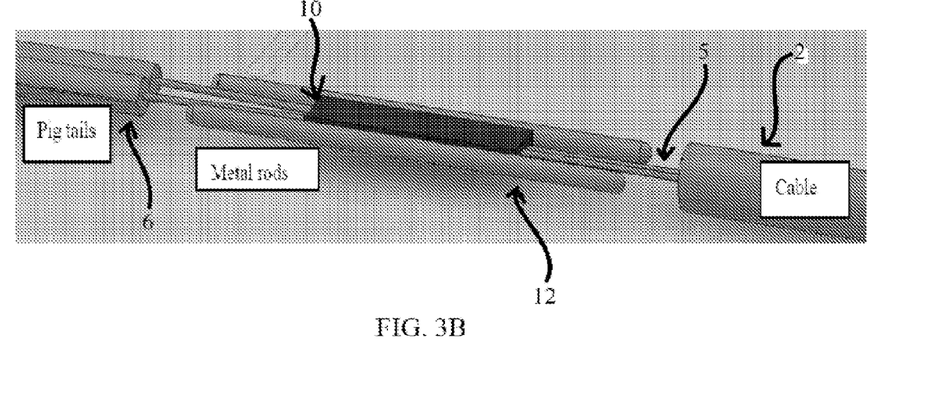
FIG. 3b is an exemplary embodiment of a transition assembly 1.

FIG. 3b is an exemplary embodiment of a transition assembly 1. Metal rods 12 are used to stabilize the protection part 10. In an exemplary embodiment, metal rods 12 along with the protection part 10 combine together for preventing a shrinkage of the cover material (not shown) at low temperature. In an exemplary embodiment, the metal rods prevent the protection part 10 from being bent or damaged.

Figure 3C:
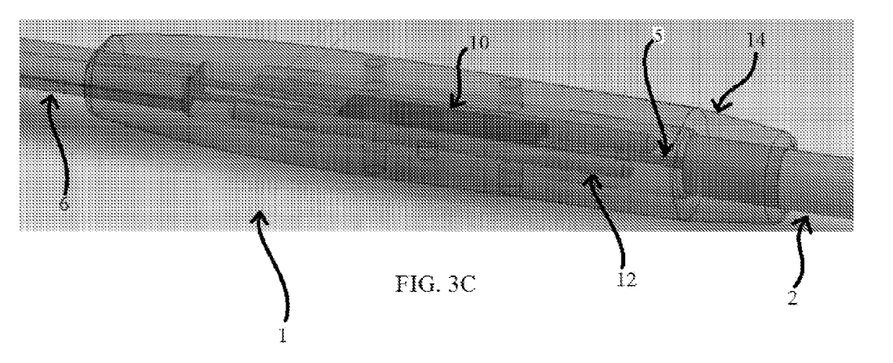
FIG. 3c is an exemplary embodiment of a transition assembly 1 comprising a cover 14.

FIG. 3c is an exemplary embodiment of a transition assembly 1 comprising a cover 14. The cover 14 protects the metal rods 12 and the protection part 10. In an exemplary embodiment, the cover 14 allows for an operator to fix other parts in the transition area in a short time. In an exemplary embodiment, the cover 14 comprises a plastic that attaches over the metal rods 12 and the protection part 10. In an exemplary embodiment, the cover comprises a liquid polymer that hardens over the metal rods 12 and the protection part 10. In an exemplary embodiment, the polymer comprises an epoxy.

Figure 4A:
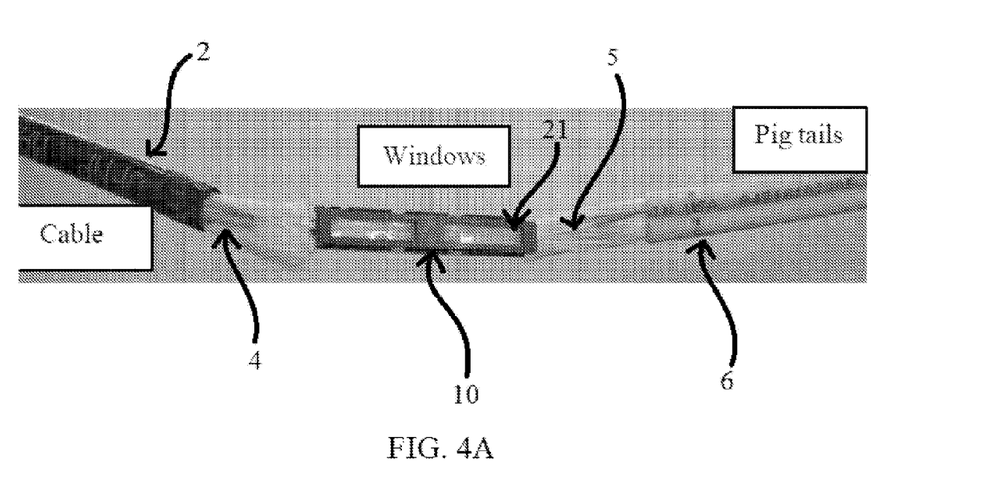
FIG. 4a is an exemplary embodiment of a transition assembly 1 comprising a fiber protection part 10 comprising an opening 21.

FIG. 4a is an exemplary embodiment of a transition assembly 1 comprising a fiber protection part 10 comprising a plurality of openings 21. In an exemplary embodiment, only one face of the fiber protection part 10 comprises openings 21.

Figure 4B:
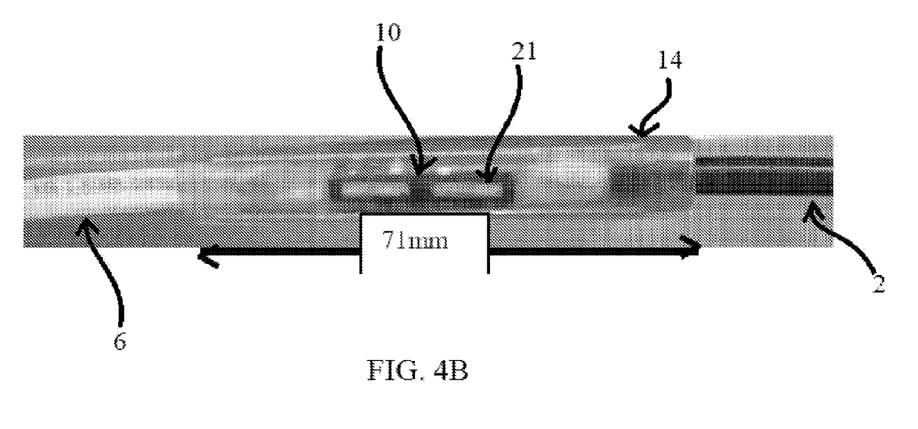
FIG. 4b is an exemplary embodiment of a transition assembly 1 comprising a fiber protection part 10 comprising an opening 21.

FIG. 4b is an exemplary embodiment of a transition assembly 1 comprising a cover 14 covering the plurality of fibers 5 and the fiber protection part 10. In an exemplary embodiment, the cover 14 comprises a fluid polymer that over molds the fiber protection part 10, and can flow through openings 21 in the fiber protection cover to provide intimate contact between the polymer and plurality of fibers 5. In an exemplary embodiment, the polymer comprises a thermoplastic. In an exemplary embodiment, the protection cover 14 protects the fibers from material dimensional changes due to environmental temperature extremes. In an exemplary embodiment, the cover 14 is 71 mm long. In an exemplary embodiment, all of the steps performed in FIGS. 2a-4b can be performed without factory equipment.

The invention claimed is:

1. A method of assembling a transition assembly, the method comprising:
    stripping a plurality of fibers at an end of a cable;
    splicing the plurality of fibers from the cable with a plurality of pigtails;
    protecting the plurality of fibers with a fiber protection part, the fiber protection part comprising openings; and
    covering the spliced fibers and the fiber protection part with a cover, wherein the cover comprises an over molded polymer that solidifies inside the openings of the fiber protection part.

2. The method according to claim 1, wherein
the openings of the fiber protection part allow for intimate contact between a polymer and the plurality of fibers.

3. The method according to claim 2, wherein
the over molded polymer provides intimate contact with the plurality of fibers.

4. A transition assembly, the assembly comprising:
    a cable;
    a plurality of fibers inside the cable;
    a plurality of pigtails;
    a fusion splice configured to combine the plurality of fibers and the plurality of pigtails;
    a plurality of connectors configured to connect the plurality of pigtails on an end opposite the fusion splice;
    a fiber protection part configured to protect the splice holder, the plurality of pigtails, and the plurality of fibers;
    a cover configured to cover the plurality of pigtails, the fiber protection part, and the plurality of fibers; and
    a plurality of metal rods being combined with the fiber protection part inside the cover for securing and protecting the fiber protection part.

5. The assembly according to claim 4, wherein
the fiber protection part comprises openings.

6. The assembly according to claim 5, wherein
the cover comprises an over molded polymer that solidifies inside the openings of the fiber protection part and protects the fibers.

7. A transition assembly, the assembly comprising:
    a cable;
    a plurality of fibers inside the cable;
    a plurality of pigtails;
    a fusion splice configured to combine the plurality of fibers and the plurality of pigtails;
    a plurality of connectors configured to connect the plurality of pigtails on an end opposite the fusion splice;
    a fiber protection part configured to protect the splice holder, the plurality of pigtails, and the plurality of fibers; and
    a cover configured to cover the plurality of pigtails, the fiber protection part, and the plurality of fibers, wherein
    the fiber protection part comprises openings, and
    the cover comprises an over molded polymer that solidifies inside the openings of the fiber protection part and protects the fibers.

* * * * *